United States Patent
Ujii

(10) Patent No.: US 8,451,313 B2
(45) Date of Patent: May 28, 2013

(54) COMMUNICATION TERMINAL AND CONTROL METHOD THEREOF

(75) Inventor: Junichi Ujii, Yokohama (JP)

(73) Assignee: Kyocera Corporation, Kyoto (JP)

( * ) Notice: Subject to any disclaimer, the term of this patent is extended or adjusted under 35 U.S.C. 154(b) by 873 days.

(21) Appl. No.: 12/528,768

(22) PCT Filed: Feb. 26, 2008

(86) PCT No.: PCT/JP2008/053332
§ 371 (c)(1),
(2), (4) Date: Oct. 20, 2009

(87) PCT Pub. No.: WO2008/105429
PCT Pub. Date: Sep. 4, 2008

(65) Prior Publication Data
US 2010/0097438 A1    Apr. 22, 2010

(30) Foreign Application Priority Data
Feb. 27, 2007  (JP) ................. 2007-047323

(51) Int. Cl.
*H04N 7/14*    (2006.01)
(52) U.S. Cl.
USPC ....................................... 348/14.08
(58) Field of Classification Search
USPC .................... 345/14.08; 348/14.08
See application file for complete search history.

(56) References Cited

U.S. PATENT DOCUMENTS

| 7,362,349 B2 | 4/2008 | Nelson et al. | 348/14.08 |
| 2004/0008249 A1 | 1/2004 | Nelson et al. | 348/14.09 |
| 2004/0008635 A1 | 1/2004 | Nelson et al. | 370/260 |
| 2005/0060368 A1* | 3/2005 | Wang et al. | 709/204 |
| 2005/0149364 A1* | 7/2005 | Ombrellaro | 705/3 |

FOREIGN PATENT DOCUMENTS

| GB | 2362534 A | * 11/2001 |
| JP | 04-339484 | 11/1992 |
| JP | 08-294103 | 11/1996 |
| JP | 2002-335502 | 11/2002 |
| JP | 2004-072741 | 3/2004 |

OTHER PUBLICATIONS

Japanese language office action dated Feb. 28, 2012 and its English translation issued in corresponding Japanese application 2009501257.
Japanese language office action (interrogation) dated Mar. 26, 2013 and its English language translation issued in corresponding Japanese application 2009501257.

* cited by examiner

*Primary Examiner* — Alexander Jamal
(74) *Attorney, Agent, or Firm* — DLA Piper LLP (US)

(57) ABSTRACT

A communication terminal 100 capable of communicating among a plurality of communication terminals includes a reception unit 14 for receiving image data from the plurality of communication terminals, a display unit 16 for displaying the image data from the plurality of communication terminals received by the reception unit 14, an input unit 17 for accepting a choice of at least one image data among the image data of the plurality of communication terminals displayed on the display unit 16 and a control unit 19 for controlling to transmit information indicating that the communication terminal corresponding to the image data chosen by the input unit 17 has been designated as the party of another communication separate from the communication being executed among the plurality of communication terminals.

4 Claims, 9 Drawing Sheets

(A)

(B)

(C)

COMMUNICATION TERMINAL AND CONTROL METHOD THEREOF

CROSS REFERENCE TO RELATED APPLICATION

This application is a national stage of international application No. PCT/JP2008/053332 filed on Feb. 26, 2008. This application also claims priority to and the benefit of Japanese Patent Application No. 2007-47323 filed on Feb. 27, 2007, the entire contents of which are incorporated herein by reference.

TECHNICAL FIELD

The present invention relates to a communication terminal capable of communicating among a plurality of communication terminals and a control method of the communication terminal.

BACKGROUND ART

As shown in a system diagram of FIG. 10, a conventional video conference systems includes a terminal apparatus with a function to connect to WAN, for example. The terminal apparatus transfers audio data and image data to a server via the IP network or the ISDN network or the like by use of H323/H320, which is a VoIP protocol, then the server relays video to each terminal apparatus and transmit the audio data to each terminal apparatus.

In particular, recently, performances and functions of portable communication terminals such as camera mounted cellular phones have been improved substantially. For example, a technique for conference participants to perform a multi-point video call by using such a compact mobile terminal is disclosed in Japanese Patent Laid-Open Application No. 2002-335502. Each participant can perform a multi-point video conference at a separate place by applying such technique.

SUMMARY OF INVENTION

Technical Problems

However, in the conventional multi-point video conference, all of the communication terminals participating in the conference are controlled as one communication session (communication path) and communication is performed on the assumption that each participant is located at a separate place. Thus, in such a multi-point video conference, what is usually done in a normal conference where participants actually get together in one place cannot be done.

In other words, in the case of a normal conference where participants get together in one place, a participant can ask quietly for advice or whisper to another participant who sits next to or near the participant about remarks made by a participant of the conference now making remarks. Things like this are usually done in an actual conference. However, at a multi-point video conference, remarks made by a participant are delivered to all other participants. Thus, for example, if a participant asks his/her colleague, who is one of the participants, for advice, what the participant has asked is known to all other participants. In such circumstance, a participant can say nothing that the participant does not want the other participants to know about, which extremely limits the contents of conversations and remarks.

Therefore, with respect to communication terminals for performing communication such as a video conference, it is an object of the present invention in view of the above mentioned circumstance to provide a communication terminal capable of performing a secret communication (hereinafter referred to as a sub-call) about which a participant does not want the other participants to know with a target communication terminal apparatus, a communication control apparatus, a communication method and a communication control method.

Solutions to Problems

In accordance with a first aspect of the invention in order to achieve the above object, a communication terminal capable of communicating among a plurality of communication terminals includes:

a reception unit for receiving image data from the plurality of communication terminals;

a display unit for displaying the image data from the plurality of communication terminals received by the reception unit;

an input unit for accepting a choice of at least one image data among the image data from the plurality of communication terminals displayed on the display unit; and a control unit for controlling to transmit information indicating that the communication terminal corresponding to the image data chosen by the input unit is designated as a party of another communication separate from a communication being executed among the plurality of communication terminals to the communication terminal.

According to a second aspect of the invention, in the communication terminal in accordance with the first aspect, when the reception unit receives a response indicating that the designation is accepted from the communication terminal designated as the party of the another communication, the control unit controls to transmit audio data of its own terminal to only the designated communication terminal.

According to a third aspect of the invention, in the communication terminal in accordance with the second aspect, when the reception unit receives the response indicating that the designation is accepted from the communication terminal designated as the party of the another communication, the control unit controls to suspend transmission of image data of its own terminal.

According to a fourth aspect of the invention, in the communication terminal in accordance with the second aspect, the control unit controls to use image data previously stored to the communication being executed among the plurality of communication terminals.

According to a fifth aspect of the invention, in the communication terminal in accordance with the first aspect, the information indicating designation is information for calling the communication terminal as a destination.

Further, in accordance with a sixth aspect of the invention in order to achieve the above object, a communication method of a communication terminal capable of communicating among a plurality of communication terminals includes:

receiving image data from the plurality of communication terminals;

displaying the received image data from the plurality of communication terminals;

accepting a choice of at least one image data among the displayed image data from the plurality of communication terminals; and controlling to transmit information indicating that the communication terminal corresponding to the chosen image data

DESCRIPTION OF THE PREFERRED EMBODIMENTS

Embodiments of the present invention will be described hereinafter with reference to the drawings.

(First embodiment)

Figure 1:
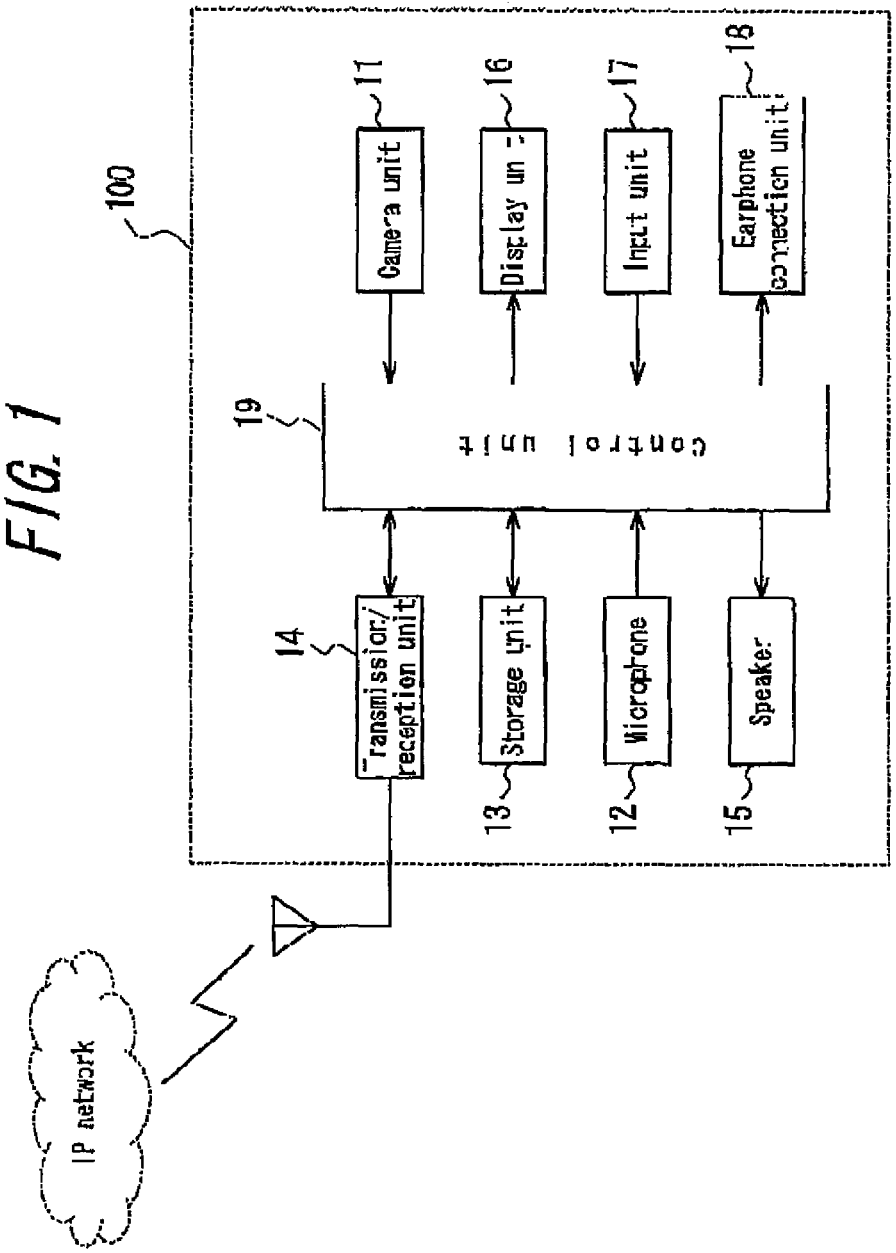
FIG. 1 is a block diagram showing a schematic configuration of a mobile terminal in accordance with a first embodiment.
Figure 2:
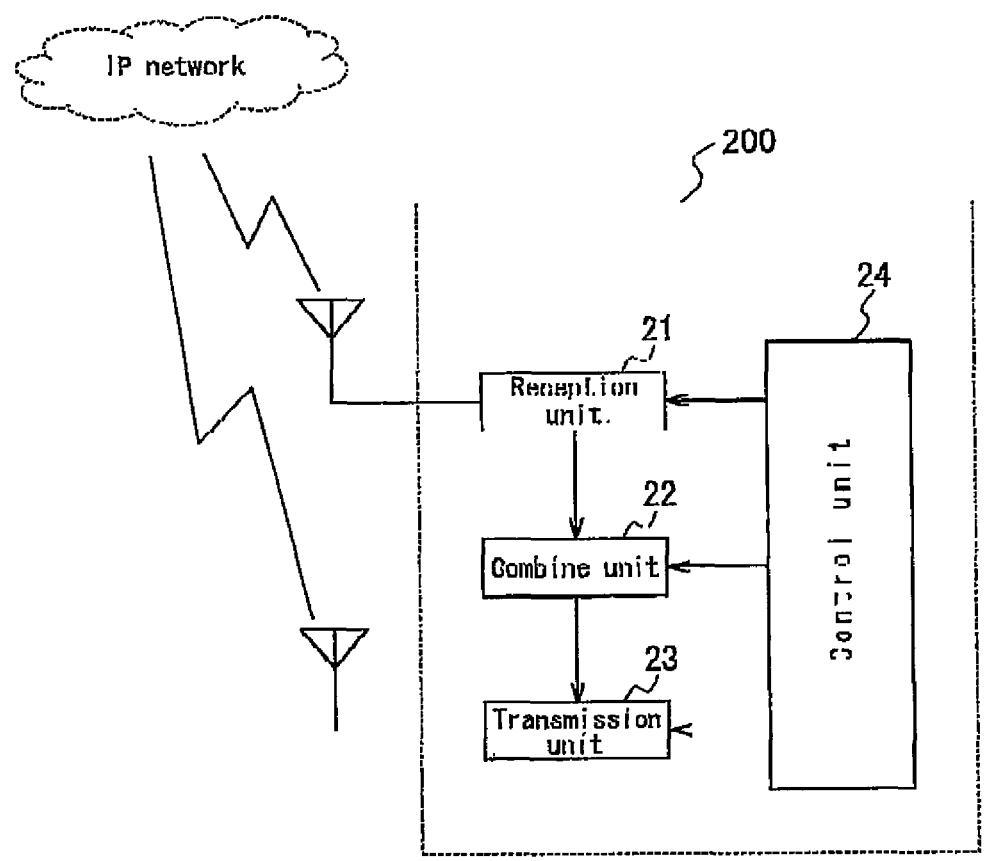
FIG. 2 is a block diagram of a schematic configuration of a communication control apparatus in accordance with the first embodiment.

FIG. 1 is a function block diagram of a mobile terminal 100 in accordance with a first embodiment of the present invention. FIG. 2 is a function block diagram of a communication control apparatus 200 in accordance with the present embodiment. Although the mobile terminal 100 is illustrated as a cellular phone, which is a communication terminal in the present embodiment, it may be, for example, a PDA (personal digital assistant), a personal computer, or a communication terminal exclusively for a video conference. In addition, the communication control apparatus 200 may be a SIP server (Session Initiation Protocol Server) that controls communication exchanged among communication terminals at multiple points.

The mobile terminal 100 shown in FIG. 1 has a camera unit 11 capable of taking an image of a participant who uses the mobile terminal 100 and a microphone 12 for taking a remark of the participant as audio. In addition, the mobile terminal 100 has a storage unit 13 for storing various settings of the mobile terminal 100 and image data of participants and capable of reading out such data or the like if required. The mobile terminal 100 further has a transmission/reception unit 14 having an antenna for transmitting and receiving image data and/or audio data of participants, a speaker 15 for outputting audio data received by the transmission/reception unit 14 and a display unit 16 for displaying image data received by the transmission/reception unit 14. Moreover, the mobile terminal 100 has an input unit 17 for accepting input of participant, an earphone connection unit 18 for outputting audio from an earphone by connecting the earphone and a control unit 19 for controlling overall operation.

The communication control apparatus 200 shown in FIG. 2 has a reception unit 21 for receiving image data and audio data from the communication terminal via the IP network or the cellular phone network. In addition, the communication control apparatus 200 has a combine unit 22 which edits image data received by the reception unit 21 by appropriately combining the data based on the setting as well as edits audio data received by the reception unit 21 by appropriately choosing based on the setting, and then transmits the edited data to the transmission unit 23. Further, the communication control apparatus 200 has a transmission unit 23 for transmitting the image data and the audio data edited by the combine unit 22 and a control unit 24 for controlling the overall operation.

Next, communication of a multi-point TV phone by use of the mobile terminal 100 and the communication control apparatus 200 in accordance with the present embodiment will be described with reference to FIGS. 3~7.

Figure 3:
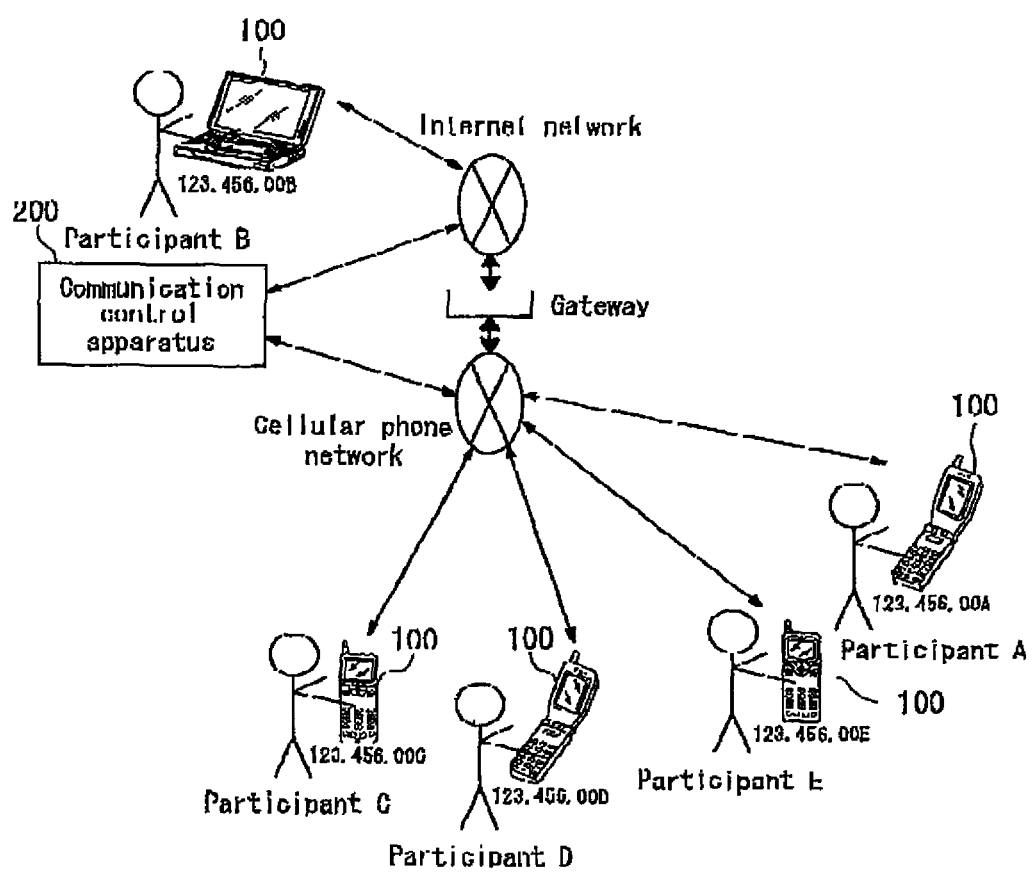
FIG. 3 is a conceptual diagram illustrating a multi-point video conference.

FIG. 3 schematically illustrates a video conference among participants A, B, C, D and E by use of multi-point TV phones as an example. Four of the participants A, C, D and E prepare respectively mobile terminals 100 and participant B prepares a personal computer having at least a function of a mobile terminal 100. Here, for convenience of explanation, the personal computer prepared by participant B is also shown as a mobile terminal 100.

Each mobile terminal 100 of participants A, C, D and E is connected to the cellular phone network via a base station and further connected from the cellular phone network to the communication control apparatus 200 via the IP network or the like. The mobile terminal 100 constituted by participant B's personal computer establishes a communication path with the communication control apparatus 200 connected to the internet network via a wired or wireless LAN or the like. The control unit 19 of mobile terminal 100 of each participant obtains an image of each participant by the camera unit 11 of each terminal and further obtains an audio of each participant by the microphone 12, then controls so that the image data and the audio data obtained respectively can be transmitted from the transmission/reception unit 14 to the communication control apparatus 200 in real time. Further, as shown in FIG. 3, the internet network and the cellular phone network are connected via a gateway. Control of call connection is performed via the communication control apparatus 200, which is a SIP server. After a session is established, packets used for communication are transmitted and received via the interne network and the cellular phone network through the gateway.

The communication control apparatus 200 performs processes for changing image data transmitted from each participant so as to have a size suitable for the mobile terminal of each participant and for adjusting the configuration of arrangement of images and the like, and edits audio data transmitted from each participant based on the setting as well. Then, the communication control apparatus 200 delivers the data to the participants. Thus all of the participants participating in the video conference by use of a mobile terminal can see images of faces or the like of all other participants and further listen to the audio of participant making remarks.

Figure 4:
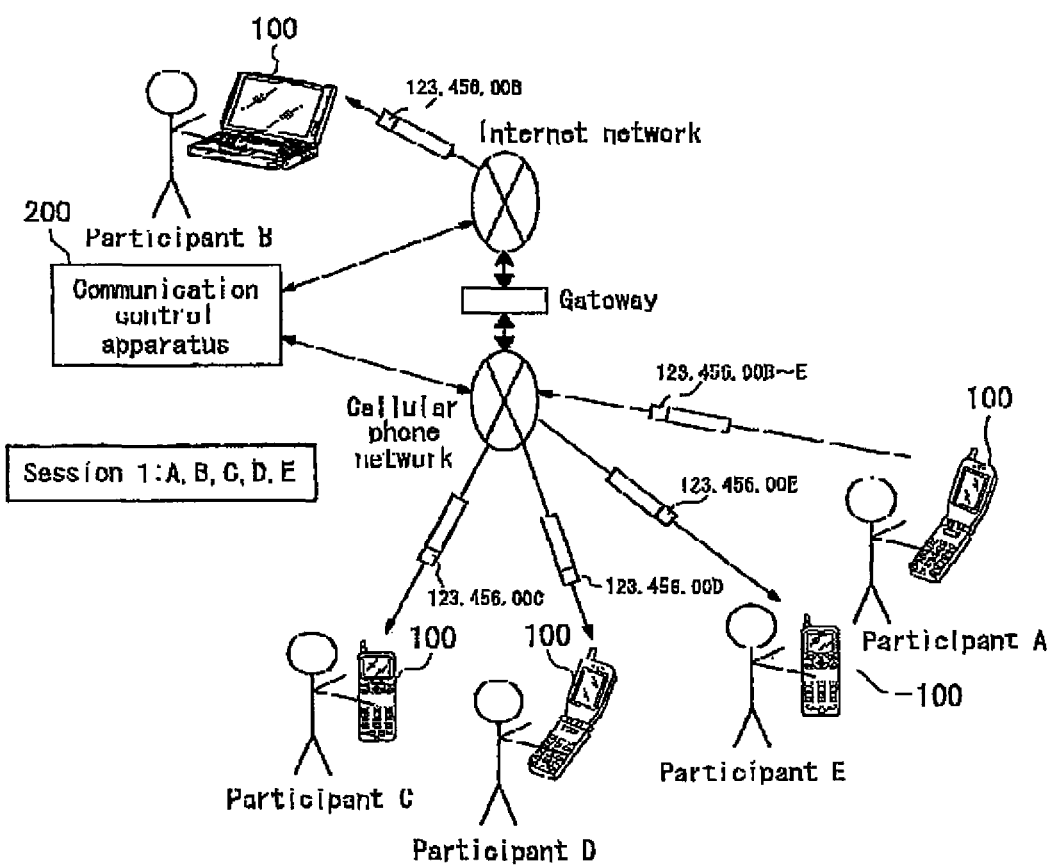
FIG. 4 is a conceptual diagram illustrating transmission and reception of a packet at a multi-point video conference.
Figure 5:
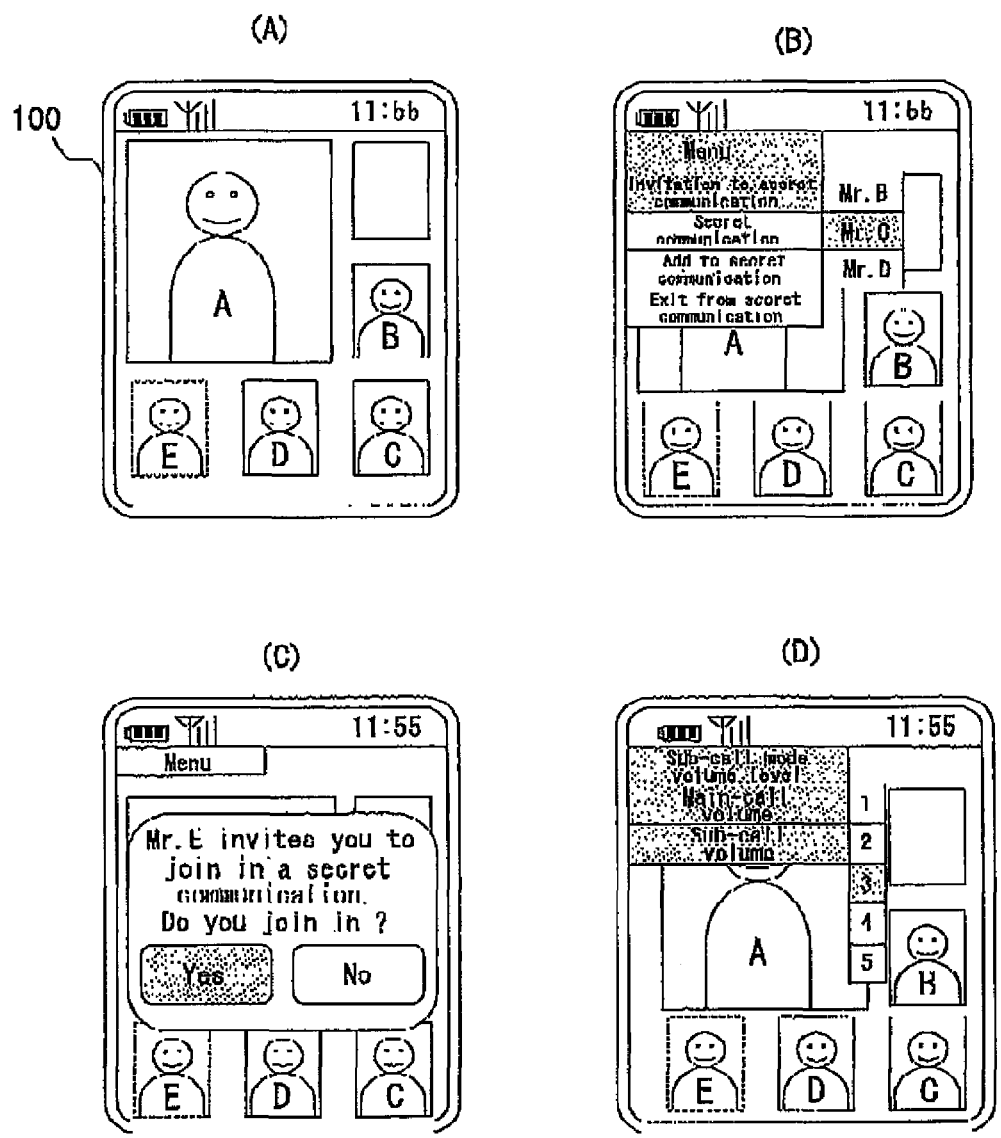
FIG. 5 shows an example of display on a display unit of the mobile terminal in accordance with the first embodiment.

FIG. 4 shows an example that participant A is making remarks at a multi-point video conference. In order for each participant to perform a multi-point video conference, at first, each mobile terminal 100 establishes session 1 with the communication control apparatus 200 as a communication path for performing communication among multi-point TV phones. Thus each participant from A to E can perform communication among multi-point TV phones.

As described above, the image data of all participants obtained by the camera unit 11 mounted on each mobile terminal 100 are transmitted to each mobile terminal 100 of participants A to E participating in the multi-point video conference. Thus each participant can view expression and appearance or the like of all participants. However, when more than one participant among all participants makes remarks at the same time and the remarks are delivered to all participants, it is difficult for each participant to listen to and understand each audio. Therefore, a concept of a "right of speaking" is set in the present embodiment and during the period in which one of the participants has the right of speaking, only the participant can transmit audio data to the other mobile terminals. In other words, during the period in which one participant has the right of speaking, even if another participant makes remarks, the audio does not reach the other participants. This is realized by controlling at the communication control apparatus 200 so that only the audio data received from a mobile terminal 100 operated by a participant having the right of speaking is delivered to each mobile terminal 100 of the other participants and so that the audio data received from each mobile terminal 100 operated by the other participants having no right of speaking is discarded by the combine unit 22 without being combined or is not received by the reception unit 21.

With respect to the "right of speaking", for example, when no one among conference participants has the right of speaking, which is in a "free" state, the right of speaking is given to the mobile terminal whose switch for making "remarks" is turned on first through operation of each mobile terminal. Then when remarks of the participant operating the mobile terminal having the "right of speaking" is completed, the "right of speaking" is cancelled in response to an operation to turn off the switch for making "remarks" by the participant who has made remarks.

In FIG. 4, when participant A makes remarks, at first, participant A obtains the "right of speaking" by operating the mobile terminal 100. After the "right of speaking" is obtained, only remarks of participant A can be listened to from speakers 15 of mobile terminals 100 of all participants. In other words, as shown in the figure, the participant A's mobile terminal 100 transmits an IP packet containing image data and audio data of participant A to the communication control apparatus 200 by specifying terminals B to E as destinations. An IP packet (not shown) containing image data and audio data of respective participants B to E is also transmitted to the communication control apparatus 200 from other mobile terminals 100. The control unit 24 of communication control apparatus 200 controls the combine unit 22 to combine image data of all participants transmitted from each mobile terminal 100 by performing processes for changing the image data to have a data size suitable for each participant's mobile terminal and for adjusting configuration of arrangement of images and the like. However, for the audio data, the control unit 24 controls the combine unit 22 to combine the audio data of only participant A having the "right of speaking" with the image data. After that, the control unit 24 controls the transmission unit 23 so that the combined image and audio data are contained in an IP packet and transmitted to each mobile terminal 100. Therefore, remarks of only participant A are delivered to each mobile terminal 100 and whatever remarks the other participants may make, the remarks are not delivered to each mobile terminal 100.

At this time, for example, the display unit 16 of participant E's mobile terminal 100 displays the image of participant A having the right of speaking larger than other participants as shown in FIG. 5(A). Around the image, other participants are displayed with smaller images. Thus images of participants A to E are displayed by splitting a screen. In addition, the image of participant E, a user of the mobile terminal 100, is displayed at the lower left, for example, and can be distinguished from the images of other participants by changing the color of a frame or representing the frame by a dotted line. Further, the upper right blank space is a space where the image of participant A has been placed when participant A has no right of speaking. Therefore, when the right of speaking is shifted to another participant, the image of participant A is made small and returned to the blank space and an image of participant who obtains the right of speaking is enlarged and displayed.

Figure 6:
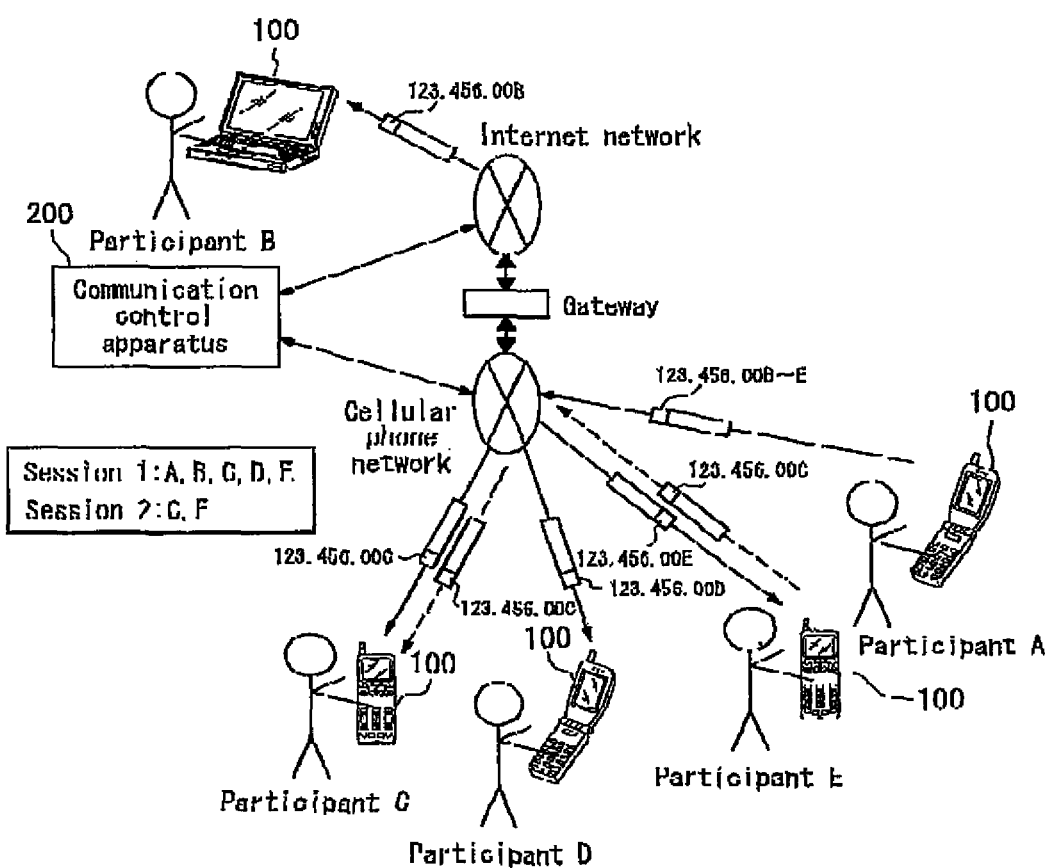
FIG. 6 is a conceptual diagram illustrating transmission and reception of a packet in a sub-call of multi-point video conference.
Figure 7:
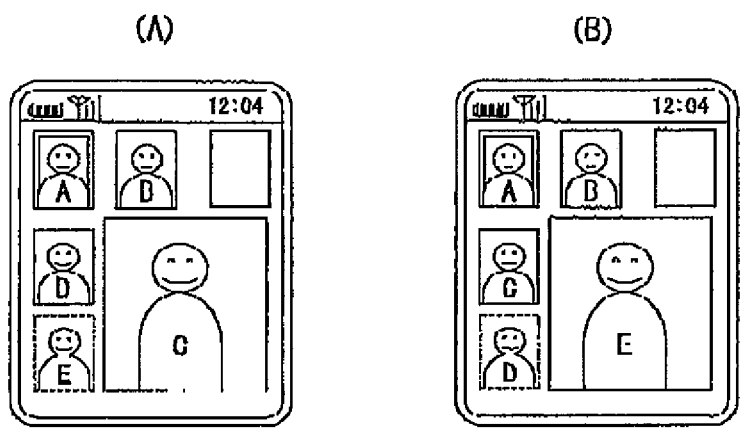
FIG. 7 shows an example of display of the display unit of the mobile terminal during a sub-call.

FIG. 6 shows an example of communication where participants E and C perform a sub-call while participant A is making remarks at a multi-point video conference in FIG. 4.

While participant A having the right of speaking is making remarks, each participant can view the images of all other participants, but can listen to the audio of only participant A. Here, a case where participant E wants to communicate with participant C about a matter that is not necessary to be advised to the other participants or that may cause a trouble if it is known to the other participants will be described. In this case, when participant E obtains the "right of speaking" and makes remarks after participant A completes making remarks, the remarks can be listened to all other participants.

Consequently, before initiating a sub-call, which is a secret communication according to the present embodiment, based on an input operation to the input unit 17 by participant E, the control unit 19 displays a menu screen as shown in FIG. 5(B) on the display unit 16 and accepts an input to choose "invitation to a secret communication" from the menu screen. Here, as an example, one of the participants, "Mr. C", is chosen as the party to be invited to the sub-call. Based on the input operation to the input unit 17, the control unit 19 of participant E's mobile terminal 100 controls the transmission/reception unit 14 to transmit a confirmation request for requesting the participant C's mobile terminal 100 to confirm whether or not a sub-call with the participant E's mobile terminal 100 is permitted to the communication control apparatus 200. In other words, the control unit 19 controls the transmission/reception unit 14 to transmit information indicating that the mobile terminal 100 corresponding to the image data chosen by the input to the input unit 17 has been designated as a party of sub-call, which is a communication separate from the communication being executed among a plurality of mobile terminals 100, to the mobile terminal 100 of the designated party. In this case, the "information indicating designation" as the party of sub-call is for calling the designated mobile terminal 100 as a destination. More specifically, it is information for calling the party up to request a call, that is, to perform a call request.

When receiving a signal of this information, the communication control apparatus 200 confirms with the participant C's mobile terminal 100 whether or not the request for sub-call from participant E is permitted. At this time, the participant C's mobile terminal can pop up a message on the display unit 16 as shown in FIG. 5(C), for example. When this pop-up message is displayed, participant C knows that he is invited from participant E for the sub-call.

When "Yes" is chosen in FIG. 5(C) in order for participant C to participate in the sub-call invited by participant E, the participant C's mobile terminal 100 notifies the communication control apparatus 200 of the permission. Then the communication control apparatus 200 establishes session 2 between the terminals of participants C and E as a new communication path, in addition to session 1 used by participants A to E for the communication of original video conference as shown in FIG. 6. Thus IP packets can be exchanged between the terminals of participants C and E via the new session 2 (in practice, two-way communication) as represented by a broken line in FIG. 6. Therefore, a call using session 2 cannot be listened to by the participants except for participants C and E.

In this manner, while a sub-call is performed between the participants E and C, the participant E's mobile terminal 100 displays an image of participant C who is the party of the sub-call to be larger than images of the other participants on the display unit 16 as shown in FIG. 7(A), for example. At this time, as shown in FIG. 7(A), enlarged display of the image of the party of sub-call at a different position from that of a participant having the right of speaking displayed in an enlarged image enables clear distinction between the party of sub-call and the participant having the right of speaking and also enables the participant himself to know that he is performing a sub-call. According to an example shown in the figure, the image of participant A having the right of speaking is the same size as that of the other participants, however, it is possible to indicate that the participant has the right of speaking by changing the frame of his image to be different from that of the other participants for distinction. On the other hand, the mobile terminal 100 of participant C who is the party of sub-call also displays the image of participant E who is the party of sub-call to be larger than those of the other participants on the display unit 16 as shown in FIG. 7(B), for example.

In this manner, due to the sub-call, participants E and C can communicate each other without being listened to by the other participants while participant A having the right of speaking is making remarks. Further, there is no case where the audio of participants performing the sub-call is overlapped with the audio of the participant having the right of speaking and listened to by the other participants. Therefore the other participants listening to the remarks made by the participant having the right of speaking are not troubled by the sub-call.

On the other hand, when participant C is invited by participant E for the sub-call (see FIG. 5(C)) and participant C chooses "No", the communication control apparatus 200 does not establish the new session 2 between the terminals of participants C and E. Therefore, participant C can reject the invitation to the sub-call. Thus a sub-call can be initiated only based on mutual agreement.

In addition, when a sub-call is performed between participants E and C, if the volume of sub-call and the volume of remarks made by participant A having the right of speaking are set to the same level, the remarks made by the participant having the right of speaking and the remarks of sub-call are mixed, causing difficulty in distinguishing between these calls. Therefore, it is desirable to set the volume of remarks made by the participant having the right of speaking to the level which is relatively lower than that of the sub-call. For example, as shown in FIG. 5(D), the volume of sub-call is set by displaying a volume setting screen on the display unit 16 based on the operation of input unit 17 before initiating a video conference or during a sub-call or the like. For example, the volume level of main-call, which is a normal video phone call, is set to 3 and the volume level of sub-call is set to 5, which is different from the volume level of main-call. In this case, since this setting is a volume setting for sub-call, when the sub-call is terminated, the volume level is returned to that before initiating the sub-call.

In addition, if the volume level of the main-call is set to the minimum level, that is, mute setting, only the audio of sub-call is listened to during the sub-call, and thus a participant can concentrate only on the audio of sub-call.

Further, the mobile terminal 100 also has the earphone connection unit 18. Thus, when a sub-call is performed, the audio of sub-call may be outputted through the earphone connected to the earphone connection unit 18 and the audio of participant having the right of speaking may be outputted through the speaker 15 based on the setting of mobile terminal 100, and vice versa. In this manner, it is possible to distinguish between the audio of sub-call and the audio of main-call more clearly. Moreover, if the earphone is a stereo earphone, the audio of sub-call and the audio of main-call can be separated into left and right. In this case, for example, when a sub-call is performed at a video conference where participants use a stereo earphone, it is desirable that the audio of participant who performs the sub-call is listened to from the right ear and the audio of participant having the right of speaking is listened to from the left ear. This is based on the consideration that the information listened to from the right ear links to the left brain (due to nerve crossover), which is a language brain, and it is often the case that the right ear is "dominant ear" for understanding words. In this case also, a sub-call and a main-call can be distinguished more clearly by setting the volume level of sub-call differently from that of main-call.

Each participant can perform a sub-call with any participant without being listened to by the other participants by using the mobile terminal 100 and the communication control apparatus 200 in accordance with the present embodiment. However, the display unit 16 of mobile terminal 100 of each participant displays images of all participants. Therefore if the other participants see an image in which lips of participant not having the right of speaking are moving, the other participants find out that a sub-call is being performed, which may result in insecure confidentiality. Therefore, in order to avoid such situation, measures are taken in the present embodiment to make the other participants difficult to find out that a sub-call is being performed. Therefore the terminal 100 and/or the communication control apparatus 200 performing a sub communication do/does not use moving images obtained in real time as images of participants performing the sub-call, but use/uses other images that have been previously set instead of the moving images.

In this process, when a sub-call is initiated between the participants, at first, each control unit 19 of mobile terminal 100 of the participants discontinues transmitting image data taken by the camera unit 11 of its own terminal in real time to the communication control apparatus 200. When transmission of the image data is discontinued, the images of participants performing the sub-call are not transmitted to the other participants, and therefore, the control unit 19 transmits a still image stored previously in the storage unit 13 as a substitute for the image data to be transmitted to the communication control apparatus 200, or the control unit 19 may transmit a still image taken just before discontinuing the transmission of image data when initiating the sub-call.

In addition, as a substitute for the image data to be transmitted to the communication control apparatus 200 when initiating a sub-call, the control unit 19 of mobile terminal 100 may transmit moving images stored previously in the storage unit 13 of mobile terminal 100, or repeatedly transmit moving images (e.g. the moving images obtained in a certain period of time before the transmission of image data is discontinued) previously stored in the storage unit 13 of mobile terminal 100. When such moving images are transmitted to the communication control apparatus 200 repeatedly, images which make the other participants feel less strange than the still images can be delivered to the other participants during the sub-call.

Moreover, in addition to the mobile terminal 100, such process may also be performed by the communication control apparatus 200. In this case, when a sub-call is initiated between arbitrary participants, the moving images or static images of the participants transmitted before initiating the sub-call are stored in the control unit 24 of communication control apparatus 200 during a predetermined period of time before a new session is established between the participants. Then, after the new session is established between the participants, the control unit 24 controls the combine unit 22 and the transmission unit 23 to combine the stored static images or moving images repeatedly with the images transmitted from the mobile terminals 100 of the other participants and to transmit the combined image to each mobile terminal 100.

When two participants are performing a sub-call, it is considered that either one of the participants wants to add another participant to the sub-call. In this case, either one of the two participants who have been performing the sub-call designates a participant whom he wants to add among the other participants and invites the participant for the sub-call. Based on an input by the participant invited for the sub-call to permit the invitation, the participant is added to the session of sub-call between the two participants. Thus it is possible to perform a sub-call among the new three participants, in addition to the video conference. After that, based on an operation to cancel the sub-call by either one of the two participants who have originally been performing the sub-call or by the participant who has joined later, a sub-call between remaining two participants is established.

More specifically, either one of the two participants (e.g. participants C and E) who have been performing the sub-call chooses another participant (e.g. participant D) whom he wants to add to sub-call from a menu screen displayed on the display unit 16 of his own mobile terminal 100 with the input unit 17. The control unit 19 controls the transmission/reception unit 14 to transmit a confirmation request for requesting a mobile terminal 100 of participant D chosen on the display unit 16 with the input unit 17 to confirm whether or not the sub-call with the mobile terminals 100 of participants C and E is permitted to the communication control apparatus 200. When receiving the confirmation request, the communication control apparatus 200 confirms with the participant D's mobile terminal 100 whether or not the sub-call with the mobile terminals 100 of participants C and E is permitted. To the confirmation request from the communication control apparatus 200, the participant D's mobile terminal 100 has its user choose whether or not to permit the sub-call with participants C and E. When the user chooses permission, the participant D's mobile terminal 100 notifies the communication control apparatus 200 of the permission. Then the communication control apparatus 200 adds the participant D's mobile terminal 100 to the sub-call session established between the mobile terminals 100 of participants C and E.

Thus, while continuing a video conference, a sub-call can be performed among three participants in parallel with the video conference. After that, based on a request for cancellation of the sub-call from either one of the mobile terminals 100 of two participants (participants C and E) who have originally been performing the sub-call or from the mobile terminal 100 of the new participant (participant D), the communication control apparatus 200 excludes the mobile terminal 100 of the participant who has submitted the request for cancellation of the sub-call from the established sub-call session. Thus a sub-call between the remaining two participants is established.

When too many participants join in a sub-call, it is likely that the original video conference, which is performed centered around a participant having the right of speaking, becomes meaningless. Therefore, the communication control apparatus 200 may limit the number of participants who can join in a session of sub-call.

Further, during a sub-call between two participants, if another participant requests a sub-call to either one of the two participants, a sub-call among three participants can be performed by the same process as described above. In other words, when either one of the two participants receives a request for sub-call from another participant during the sub-call, the participant who has requested the sub-call is added to the session of sub-call between the two participants based on an input for permission by the participant who has received the request for sub-call. Thus, in addition to a video conference, a sub-call can be performed among three participants.

More specifically, while a session of sub-call is established between the mobile terminals 100 of two participants (e.g. participants C and E), and when a mobile terminal 100 of either one (e.g. participant C) of the participants receives a request for sub-call from a mobile terminal 100 of another participant (e.g. participant D) and the user chooses complying with the request (that is, permission of sub-call), the participant C's mobile terminal 100 notifies the communication control apparatus 200 of it. Then the communication control apparatus 200 adds the participant D's mobile terminal 100 to the session of sub-call established between the mobile terminals 100 of participants C and E. Thus it is possible to perform a sub-call among three participants in parallel with the video conference.

In this case, the communication control apparatus 200 may limit the number of participants who can join in the session of sub-call. On the other hand, it is also possible to design the communication control apparatus 200 so that the participants in a sub-call cannot be designated by another participant for sub-call.

In this manner, when a sub-call is performed among more than three participants, for example, it is desirable to display an enlarged image of a participant having the right of speaking among participants performing the sub-call and to display the images of other participants of the sub-call on the display unit 16 by changing the color of the frame of image or by representing the frame by a dotted line to distinguish from the other participants. Alternatively, it is also possible to display an enlarged image of participant having the right of speaking in a communication at a normal video conference (not a sub-call) and with respect to all participants performing a sub-call, to change the frame color of image or to represent the frame by a dotted line or the like in order to be distinguished from the images of the other participants.

(Second Embodiment)

Next, a video conference using a mobile terminal 100 and a communication control apparatus 200 in accordance with a second embodiment of the present invention will be described. Because the outline of sub-call at a video conference in accordance with the second embodiment is the same as that in accordance with the first embodiment, the same descriptions are omitted.

According to the present embodiment, in the mobile terminal 100 shown in FIG. 1 of the first embodiment, the input unit 17 is constituted by a touch panel superimposed on a front face of the display unit 16. Other than that, there is no major structural difference between the mobile terminal in accordance with the present embodiment and the mobile terminal 100 described in the first embodiment. In the mobile terminal 100 in accordance with the present embodiment, each participant of video conference performs an input by operating the touch panel with his finger or an input device such as a stylus pen. At this time, when a participant touches a choice item displayed on the display unit 16, the touch panel corresponding to the item is touched. The input unit 17 detects a position touched on the touch panel and transmits a signal corresponding to the chosen item to the control unit 19.

Figure 8:
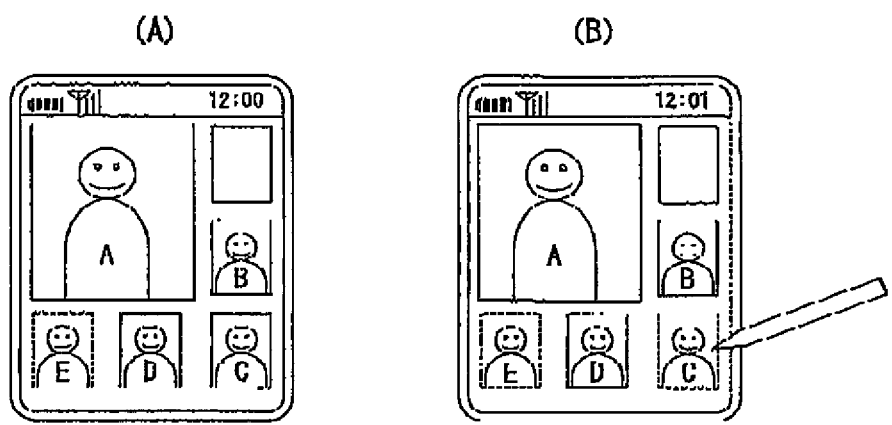
FIG. 8 shows an example of display of a display unit of a mobile terminal in accordance with a second embodiment.
Figure 9:
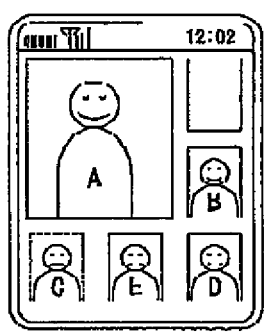
FIG. 9 shows an example of display of the display unit of the mobile terminal in accordance with the second embodiment.
Figure 9:
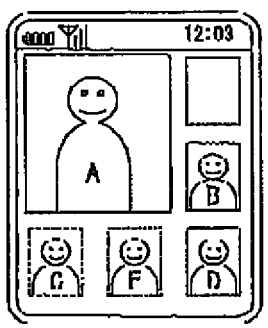
Figure 9:
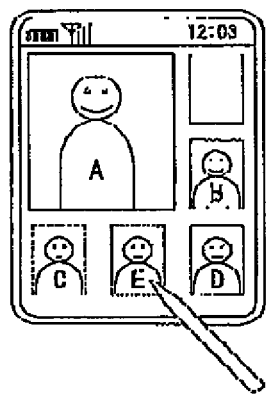
Figure 10:
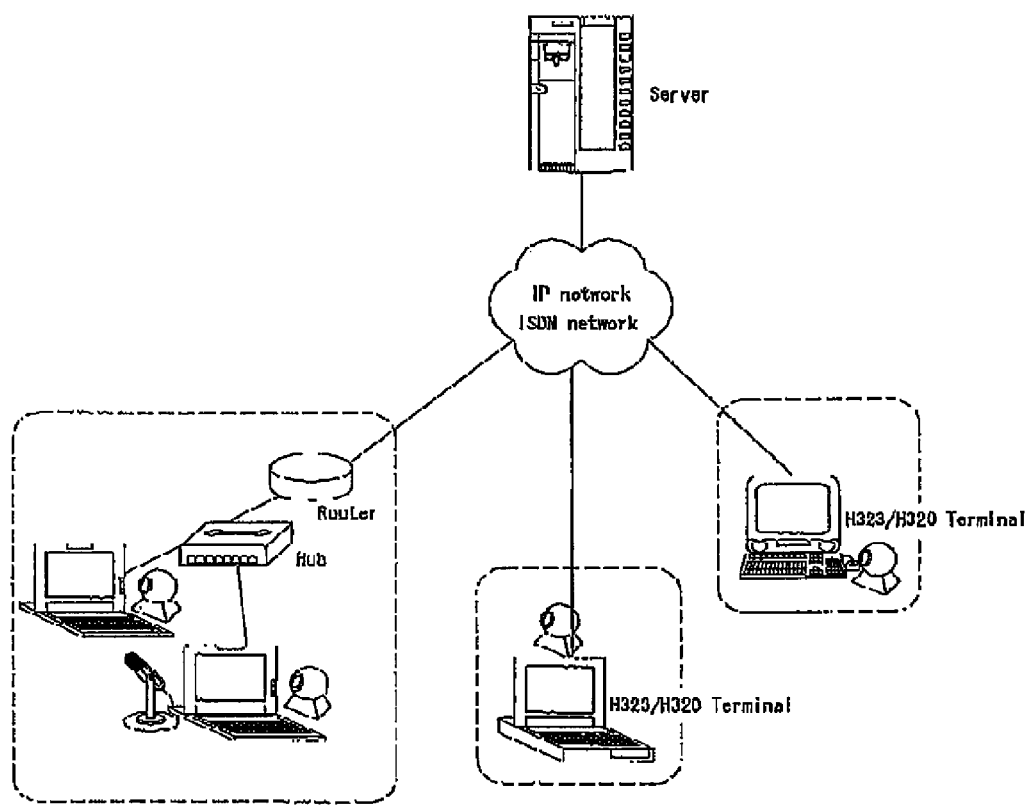
FIG. 10 shows a schematic configuration of the conventional video conference.

In the present embodiment, initiation and termination processes of sub-call at a video conference are mainly different from those of the first embodiment described above. Therefore, these processes are described below with reference to FIGS. 8 and 9.

For convenience of explanation, description is given on the assumption that the conditions are the same as those of the first embodiment. In other words, a case where participant E desires to perform a sub-call with participant C while participant A having the right of speaking is making remarks will be described.

In the present embodiment, when participants initiate a sub-call, an input operation to designate a party of sub-call is different from that of the first embodiment described above. That is, although a menu screen is displayed on the display unit 16 in the first embodiment, according to the present embodiment, a participant directly touches an image of the party with whom the participant desires to initiate a sub-call among images of participants displayed separately on the display unit 16 with a pen-type device or his finger. For example, in this case, the control unit 19 of mobile terminal 100 of participant E who desires to perform a sub-call displays an enlarged image of participant A having the right of speaking on the display unit 16 as shown in FIG. 8(A). Here, in the mobile terminal 100 of participant E who desires to perform a sub-call with participant C, if participant E touches the image of participant C on the touch panel with a pen-type device or his finger as shown in FIG. 8(B), the control unit 19 changes the frame of image or blinks the image of participant C based on the input onto the touch panel. Thus participant E can easily recognize that he has chosen participant C as the party of sub-call.

Based on the input onto the touch panel, the control unit 19 controls the transmission/reception unit 14 to transmit a confirmation request to the participant C's mobile terminal 100 via the communication control apparatus 200. This confirmation request is a request to confirm whether or not the mobile terminal 100 of participant C permits the sub-call.

While waiting for a permission for the sub-call from participant C, the control unit 19 of mobile terminal 100 of participant E leaves the distinction of display from images of the other participants (blinking of image, decoration of frame or the like) on the image of participant C designated as the party of the sub-call, as shown in FIG. 8(B). Suppose an operation by participant E to designate participant C using the touch panel is made by mistake such as unintentional error in operation, the control unit 19 cancels the operation (request for sub-call) when the image of participant C is touched again, provided participant C does not permit the sub-call yet.

On the other hand, the participant C's mobile terminal 100 displays images as shown in FIG. (A) on the display unit 16 before receiving a request for sub-call from participant E. When receiving the request for sub-call from participant E, the control unit 19 of mobile terminal 100 controls to change the frame of image or to blink the image of participant E displayed on the display unit 16 as shown in FIG. 9(B). Thus, participant C knows that a sub-call is requested by participant E. After that, as shown in FIG. 9(C), when the image of participant E who requests the sub-call is touched by participant C with a pen-type device or his finger, the control unit 19 permits the request for sub-call from participant E. Thus the communication control apparatus 200 establishes session 2 as a new communication path only between the terminals of participants C and E. Therefore the sub-call can be performed between the terminals of participants C and E.

When participant C does not desire to perform the sub-call with participant E, participant C leaves the image of participant E which is distinguished (by blinking of image or decoration of frame or the like) from the images of other participants as it is. In this manner, if the request for sub-call is not permitted, the communication control apparatus 200 does not establish the new session 2 between the terminals of participants C and E, and thus the sub-call is not initiated. In this case, the sub-call can be cancelled by accepting a cancel operation in which the image of participant C is retouched on the participant E's mobile terminal 100 or by taking a time-out process by the communication control apparatus 200. Thus a sub-call is initiated only when both participants mutually agrees.

In addition, in case where either participant E or C terminates a sub-call after the sub-call is initiated between participants E and C, when either participant E or C touches an image of the party of sub-call displayed on the display unit 16 with a pen-type device or his finger as shown in FIG. 7(A) or 7(B), the control unit 19 controls the transmission/reception unit 14 to transmit a request for discontinuing a session for sub-call between participants E and C to the communication control apparatus 200. Thus the communication control apparatus 200 disconnects the session for sub-call between participants E and C, and therefore, the sub-call is terminated. After this, each mobile terminal 100 of participants E and C shows a screen as shown in FIGS. 8(A) and 9(A) respectively, and returns to the original video conference.

In the present embodiment, during a sub-call between two participants, if either participant C or E wants to add another participant to the sub-call, he touches on a touch panel an image of the desired participant among the other participants displayed on the display unit 16 of mobile terminal 100 of either participant C or E. The mobile terminal 100 of the participant invited for the sub-call changes the image displayed on the display unit 16 of the participant who has invited for sub-call to notify the participant of being invited for sub-call. When the participant invited for the sub-call touches the image of the participant who has invited for the sub-call, the control unit 19 permits the request for the sub-call. Thus the participant invited for the sub-call can join in the sub-call.

Further, during a sub-call between two participants, if another participant requests either one of the two participants to join him in the sub-call, the another participant's mobile terminal 100 transmits a request for joining in the sub-call, when the image of the participant displayed on the display unit 16 is touched on the touch panel, to the mobile terminal 100 of the participant touched. The mobile terminal 100 of the participant (already in the sub-call) who has received a request for joining in the sub-call changes the image of another participant who has requested for joining in the sub-call displayed on the display unit 16 and notifies the participant who has already been performing the sub-call of reception of the request for joining in the sub-call from another participant. The mobile terminal 100 of participant who has received the request for joining in the sub-call permits the request for joining in the sub-call when the image of the participant who has requested joining in the sub-call is touched on the touch panel. After that, the communication control apparatus 200 adds the participant who has requested for joining in the sub-call to the session of sub-call between the two participants and continues the video conference while performing the sub-call among the three participants in parallel with the video conference.

In case where a sub-call among more than three participants is terminated, a mobile terminal 100 of each participant performing the sub-call exits the sub-call and returns to the original video conference when each participant touches his own image displayed on the display unit 16 on the touch panel. Further, when a sub-call is performed between two participants, an enlarged image of the party of sub-call is displayed on the display unit 16. In case where the sub-call between two participants is terminated, a mobile terminal 100 terminates the sub-call and returns to the original video conference when each participant touches his own image or the image of the party displayed on the display unit 16 on the touch panel.

According to the present embodiment, it is possible to choose a party of sub-call quickly, instinctively and reliably through a touch panel operation, requiring no key operation. Therefore, by use of a sub-call, it is possible to quickly and timely confirm or consult with another participant about remakes of a participant having the right of speaking. In addition, when the sub-call is terminated, it is possible to return immediately to the original conference by terminating the sub-call. Further, because it is possible to choose the party of sub-call while viewing, it is possible to reduce significantly the possibility of mistakes in operation. Moreover, since it is not necessary to display a menu screen, images of participants are not hidden by the menu screen which is displayed during a video conference. And, at the side that receives a request for a sub-call, images of participants are not hidden by a popup display on a screen.

Further, the present invention is not limited to the embodiments described above, and various modifications or changes may be made. For example, the above described each embodiment is described as a video conference using image data and audio data, however, it is possible to use audio data only without using image data to apply to a configuration performing a sub-call at a multi-point telephone conference.

Moreover, in the second embodiment, when a participant is invited by another participant for a sub-call in the same way as the first embodiment, the display unit 16 of mobile terminal 100 of the participant who is invited for the sub-call may display a popup as shown in FIG. 5(C). In this case, the participant who is invited can permit or refuse the invitation for the sub-call based on the input to choose "Yes" or "No".

Industrial Applicability

According to the present invention, while a multi-point video conference is performed among a plurality of communication terminals, a sub-call between at least two participants who participate in the video conference is possible without being listened to by the other participants. Therefore, the participants who perform the sub-call can communicate freely without being noticed by the other participants, and thus conference can be run smoothly in an environment which is closer to the environment where participants actually get together.

The invention claimed is:

1. A communication terminal capable of communicating among a plurality of communication terminals, comprising:
a reception unit for receiving image data from the plurality of communication terminals;
a display unit for displaying the image data from the plurality of communication terminals received by the reception unit;
an input unit for accepting a choice of at least one image data among the image data from the plurality of communication terminals displayed on the display unit, and
a control unit for controlling to transmit information indicating that the communication terminal corresponding to the image data chosen by the input unit is designated as a party of another communication separate from a communication being executed among the plurality of communication terminals to the communication terminal, wherein
when the reception unit receives a response indicating that the designation is accepted from the communication terminal designated as the party of the another communication, the control unit controls to transmit audio data of its own terminal to only the designated communication terminal, and
when the reception unit receives the response indicating that the designation is accepted from the communication terminal designated as the party of the another communication, the control unit controls to suspend transmission of image data of its own terminal.

2. A communication terminal capable of communicating among a plurality of communication terminals, comprising:
a reception unit for receiving image data from the plurality of communication terminals;
a display unit for displaying the image data from the plurality of communication terminals received by the reception unit;
an input unit for accepting a choice of at least one image data among the image data from the plurality of communication terminals displayed on the display unit; and
a control unit for controlling to transmit information indicating that the communication terminal corresponding to the image data chosen by the input unit is designated as a party of another communication separate from a communication being executed among the plurality of communication terminals to the communication terminal, wherein
when the reception unit receives a response indicating that the designation is accepted from the communication terminal designated as the party of the another communication, the control unit controls to transmit audio data of its own terminal to only the designated communication terminal, and
the control unit controls to use image data previously stored to the communication being executed among the plurality of communication terminals.

3. The communication terminal according to claim 1, wherein the information indicating designation is information for calling the communication terminal as a destination.

4. A control method of a communication terminal capable of communicating among a plurality of communication terminals, comprising:
receiving image data from the plurality of communication terminals;
displaying the received image data from the plurality of communication terminals;
accepting a choice of at least one image data among the displayed image data from the plurality of communication terminals; and
controlling to transmit information indicating that the communication terminal corresponding to the chosen image data is designated as a party of another communication separate from a communication being executed among the plurality of communication terminals, wherein
when a response is received indicating that the designation is accepted from the communication terminal designated as the party of the another communication, audio data of its own terminal is transmitted to only the designated communication terminal, and when the response is received indicating that the designation is accepted from the communication terminal, transmission of image data of its own terminal is suspended.

* * * * *